US012531176B2

(12) United States Patent
Yamamoto

(10) Patent No.: US 12,531,176 B2
(45) Date of Patent: Jan. 20, 2026

(54) VEHICLE-MOUNTED APPARATUS

(71) Applicant: YOKOWO CO., LTD., Tokyo (JP)

(72) Inventor: Tsugio Yamamoto, Tokyo (JP)

(73) Assignee: YOKOWO CO., LTD., Tokyo (JP)

( * ) Notice: Subject to any disclaimer, the term of this patent is extended or adjusted under 35 U.S.C. 154(b) by 366 days.

(21) Appl. No.: 18/025,537

(22) PCT Filed: Aug. 20, 2021

(86) PCT No.: PCT/JP2021/030546
§ 371 (c)(1),
(2) Date: Mar. 9, 2023

(87) PCT Pub. No.: WO2022/162982
PCT Pub. Date: Aug. 4, 2022

(65) Prior Publication Data

US 2023/0360834 A1 Nov. 9, 2023

(30) Foreign Application Priority Data

Jan. 29, 2021 (JP) ................................ 2021-012775

(51) Int. Cl.
*H01F 7/16* (2006.01)
*H01F 7/121* (2006.01)

(52) U.S. Cl.
CPC .............. *H01F 7/16* (2013.01); *H01F 7/121* (2013.01)

(58) Field of Classification Search
CPC . H01F 7/16; H01F 7/121; G07B 15/00; E05B 19/00; E05B 49/00; G07C 9/00896; G07C 9/00944
USPC ...................................................... 455/575.1
See application file for complete search history.

(56) References Cited

U.S. PATENT DOCUMENTS

2020/0299998 A1* 9/2020 Testa .................. G07C 9/00174
2022/0172541 A1* 6/2022 Takahashi .......... G07C 9/00912

FOREIGN PATENT DOCUMENTS

JP S55-063025 U1 4/1980
JP 2019-512630 A 5/2019
JP 6710832 B1 6/2020

OTHER PUBLICATIONS

Oct. 12, 2021, International Search Report issued for related PCT Application No. PCT/JP2021/030546.
Oct. 12, 2021, International Search Opinion issued for related PCT Application No. PCT/JP2021/030546.

* cited by examiner

*Primary Examiner* — Eugene Yun
(74) *Attorney, Agent, or Firm* — Paratus Law Group, PLLC

(57) ABSTRACT

A vehicle-mounted apparatus includes an accommodation portion that is configured to accommodate an electronic key of a vehicle, an actuator that is configured to perform a press operation to the electronic key accommodated in the accommodation portion by moving a movable portion in one direction, and an intermediate member that is disposed between the electronic key accommodated in the accommodation portion and the actuator and that is configured to transmit a force of the press operation to a press button of the electronic key. The intermediate member is configured to abut against the movable portion and to apply a biasing force for biasing the movable portion in a direction opposite to the one direction.

6 Claims, 11 Drawing Sheets

[IV-IV CROSS-SECTION]

[VI-VI CROSS-SECTION]

[XIII-XIII CROSS-SECTION]

VEHICLE-MOUNTED APPARATUS

CROSS REFERENCE TO PRIOR APPLICATION

This application is a National Stage Patent Application of PCT International Patent Application No. PCT/JP2021/030546 (filed on Aug. 20, 2021) under 35 U.S.C. § 371, which claims priority to Japanese Patent Application No. 2021-012775 (filed on Jan. 29, 2021), which are all hereby incorporated by reference in their entirety.

TECHNICAL FIELD

The present invention relates to a vehicle-mounted apparatus mounted in a vehicle.

BACKGROUND ART

A mode of using an automobile includes sharing one or a plurality of vehicles among a plurality of persons. Car sharing and rental cars correspond to this. Hereinafter, such a usage mode will be collectively referred to as "sharing".

In sharing, handling a key for using a vehicle for sharing is important. For example, Patent Literature 1 discloses an electronic key accommodation device useable for sharing or the like. Specifically, the accommodation device is provided with a press mechanism that presses a press button of an electronic key fitted into a riding holder. The press mechanism includes a solenoid that is an actuator that linearly moves a movable iron core, a coupling tool that is connected to a tip end of the movable iron core and extends above the press button, and a soft elastic member that is installed so as to be directed from a tip end of the coupling tool to the press button. That is, the press mechanism is a mechanism in which the elastic member approaches the press button and presses the press button when the solenoid is operated.

In the press mechanism using the solenoid, an impact force exceeding a load necessary for operating the press button may be applied to the press button and the press button may be damaged or the life may be reduced. In the technique of Patent Literature 1, the elastic member is installed to the tip end of the coupling tool. It is expected that the elastic member absorbs the impact force, thereby preventing breakage of the press button and suppressing a decrease in life.

CITATION LIST

Patent Literature

Patent Literature 1: JP6710832B

SUMMARY OF INVENTION

Technical Problem

The solenoid is a mechanism that operates the movable iron core provided in a movable portion by an electromagnetic force. The electromagnetic force is operated in one direction, and accordingly an element that returns the movable iron core to an original position, for example, a coil spring called a return spring, is necessary after the operated electromagnetic force disappears.

A general-purpose return spring is usually provided outside the solenoid. Since a return spring and a space for accommodating the return spring are necessary for the actuator, a total length in the operation direction of the actuator in the related art is so long. For this reason, the size of the device that accommodates the electronic key in the related art is also so long in the operation direction.

An example of the object of the present invention is to provide a technique of reducing a length in an operation direction of a vehicle-mounted apparatus in which a press button of an accommodated electronic key is mechanically pressed and operated by an actuator.

Solution to Problem

According to an aspect of the present invention, there is provided a vehicle-mounted apparatus including: an accommodation portion that is configured to accommodate an electronic key of a vehicle; an actuator that is configured to perform a press operation to the electronic key accommodated in the accommodation portion by moving a movable portion in one direction; and an intermediate member that is disposed between the electronic key accommodated in the accommodation portion and the actuator and that is configured to transmit a force of the press operation to a press button of the electronic key. The intermediate member is configured to abut against the movable portion and to apply a biasing force for biasing the movable portion in a direction opposite to the one direction.

According to this aspect, the actuator does not need to be provided with a return spring. For this reason, in the vehicle-mounted apparatus in which the press button of the accommodated electronic key is mechanically pressed and operated by the actuator, the length in the operating direction can be made shorter than that of a device in the related art.

DESCRIPTION OF EMBODIMENTS

Figure 1:
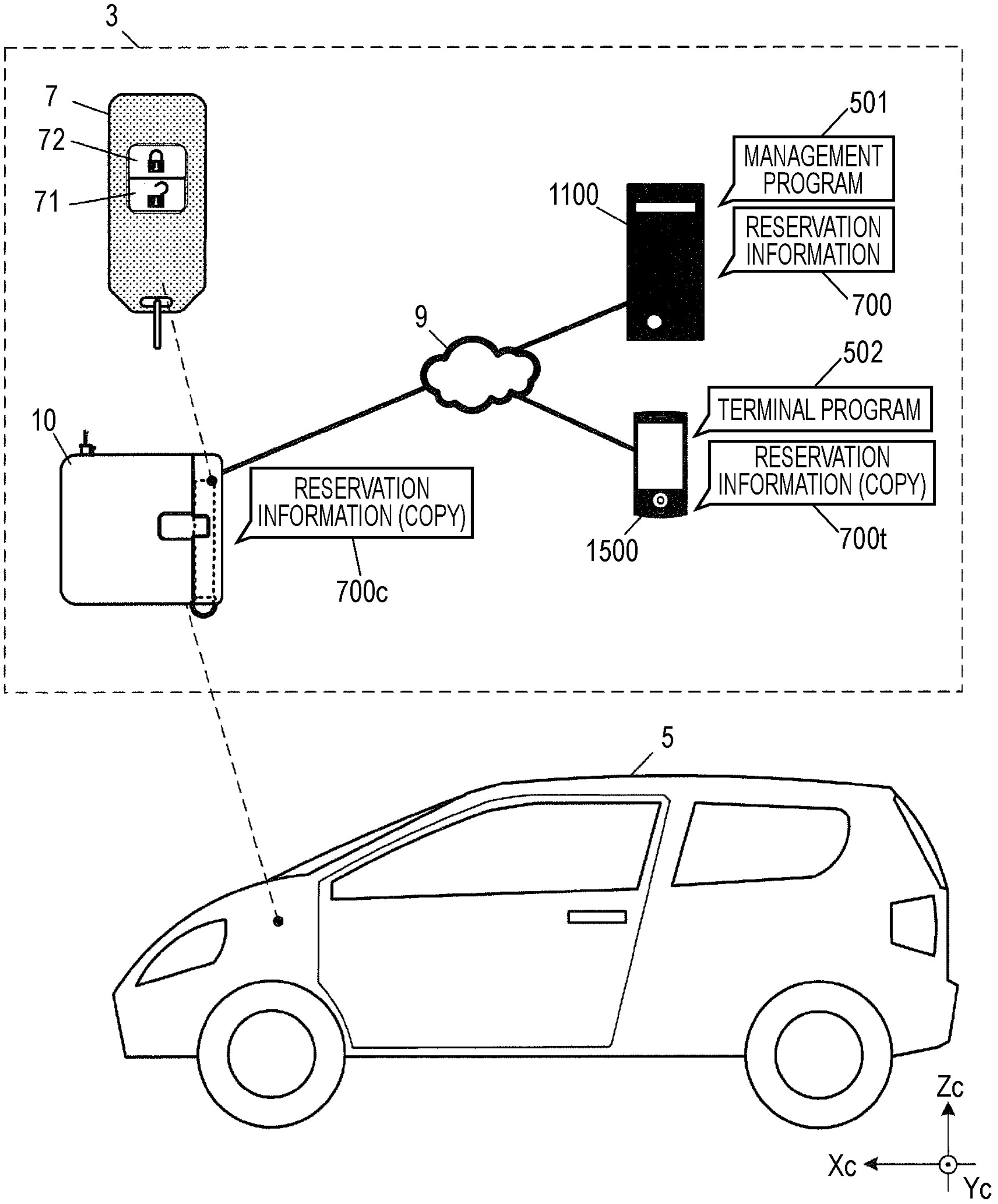
FIG. 1 is a view showing an example of a system configuration of a sharing system.

Hereinafter, an example of a preferred embodiment will be described, but the embodiment is not limited to the following aspects. In the drawings, three orthogonal axes of a right-handed system are shown. In the following description, a positive direction of an X axis is referred to as front, a negative direction of the X axis is referred to as rear, a positive direction of a Y axis is referred to as left, a negative direction of the Y axis is referred to as right, a positive direction of a Z axis is referred to as upper, and a negative direction of the Z axis is referred to as lower.

FIG. 1 is a view showing an example of a system configuration of a sharing system.

A sharing system 3 includes a vehicle-mounted apparatus 10 that accommodates an electronic key 7 of a vehicle 5 for sharing, a server system 1100 that communicably connects to the vehicle-mounted apparatus 10 via a network 9, and a user terminal 1500 that communicably connects to the vehicle-mounted apparatus 10 via the network 9. The electronic key 7 is a genuine key belonging to the vehicle 5. The user terminal 1500 is a terminal used by a user in sharing. One vehicle-mounted apparatus 10 is provided in the vehicle 5. In actual operation of the sharing system 3, one or a plurality of sets of the vehicle 5 and the vehicle-mounted apparatus 10 are prepared. An example of the user terminal 1500 includes a smartphone or the like owned by the user.

The electronic key 7 includes an unlocking button 71, a locking button 72, a key ring 73, and a key ring install portion 74 for installing the key ring 73. The unlocking button 71 and the locking button 72 are press buttons for unlocking/locking a locking mechanism provided in the vehicle 5 for sharing. The electronic key 7 transmits a predetermined unlocking signal when the unlocking button 71 is pressed, and transmits a predetermined locking signal when the locking button 72 is pressed. The electronic key 7 may include a built-in or exposed physical key. The electronic key 7 is an original genuine key belonging to the vehicle 5, and may also be a key normally duplicated through a predetermined procedure designated by a vehicle manufacturer. The key ring 73 may be a string and may be omitted.

The network 9 refers to a communication path through which data communication is possible. That is, the network 9 includes a communication network such as a telephone communication network, a cable network, and the Internet, in addition to a local area network (LAN) using a dedicated line (dedicated cable) for direct connection, Ethernet (registered trademark), or the like. Further, the communication method may be wired, or may be wireless.

The server system 1100 performs user registration and reservation management of the sharing system 3, and provision of reservation information to the user terminal 1500 and the vehicle-mounted apparatus 10. Specifically, the server system 1100 stores a management program 501, and executes the management program 501, thereby implementing (1) a user registration function, (2) a reservation setting function for each vehicle 5, (3) a function of generating reservation information 700 (for example, unique reservation ID, reserved vehicle ID, reservation period, password), (4) a function of providing a copy of the reservation information 700 (reservation information 700*t*) to the user terminal 1500, and (5) a function of providing a copy of the reservation information 700 (reservation information 700*c*) to the vehicle-mounted apparatus 10.

The user terminal 1500 is a computer system connectable to the network 9 used by a user who wants to share the vehicle 5. The user terminal 1500 is implemented by, for example, a smartphone, a tablet computer, a notebook computer, or a wearable computer.

The user terminal 1500 can store and execute an application program. As the application program, a terminal program 502 is stored. The terminal program 502 implements (1) a function of accessing the server system 1100, (2) a function of communicably connecting to the vehicle-mounted apparatus 10 and making a predetermined unlocking request to the vehicle-mounted apparatus 10 in response to an unlocking operation to the user terminal 1500 by the user, providing the vehicle-mounted apparatus 10 with the reservation information 700*t*, and unlocking to cause the unlocking button 71 of the electronic key 7 accommodated in the vehicle-mounted apparatus 10 to be pressed, and (3) a function of communicably connecting to the vehicle-mounted apparatus 10 and making a predetermined locking request in response to a locking operation to the user terminal 1500 by the user, providing the vehicle-mounted apparatus 10 with the reservation information 700*t* to cause the locking button 72 of the electronic key 7 accommodated in the vehicle-mounted apparatus 10 to be pressed.

Figure 2:
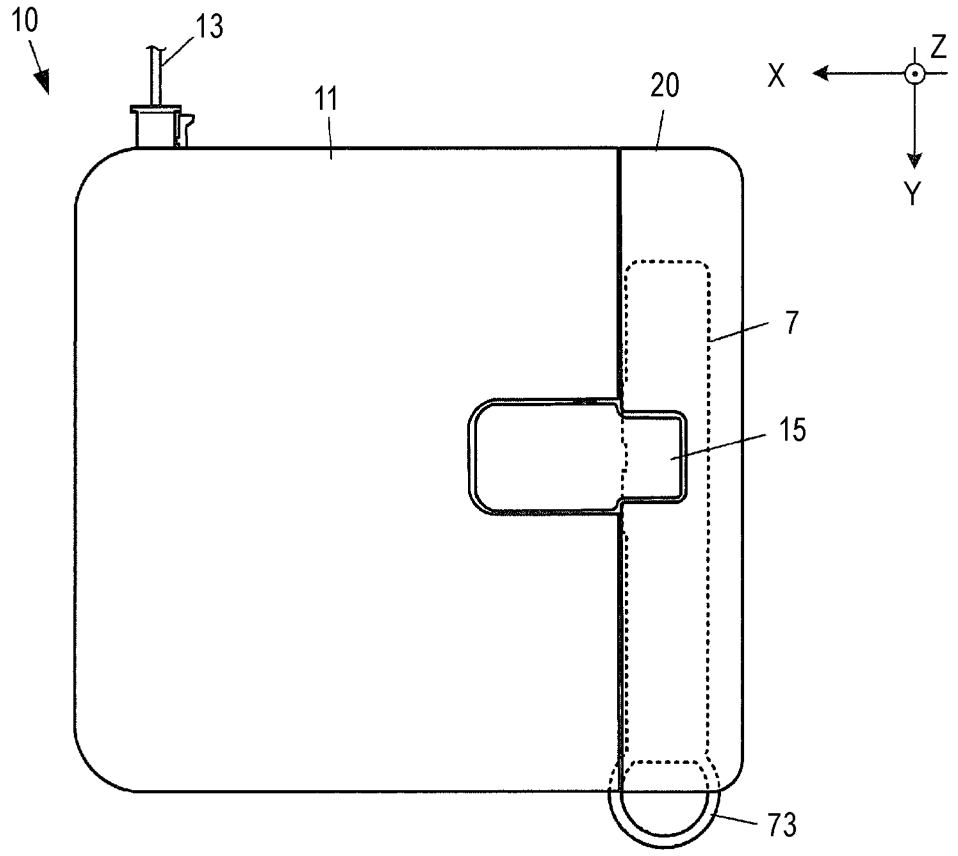
FIG. 2 is a top view showing an example of an external appearance of a vehicle-mounted apparatus.

FIG. 2 is a top view showing an example of an external appearance of the vehicle-mounted apparatus 10.

Figure 3:
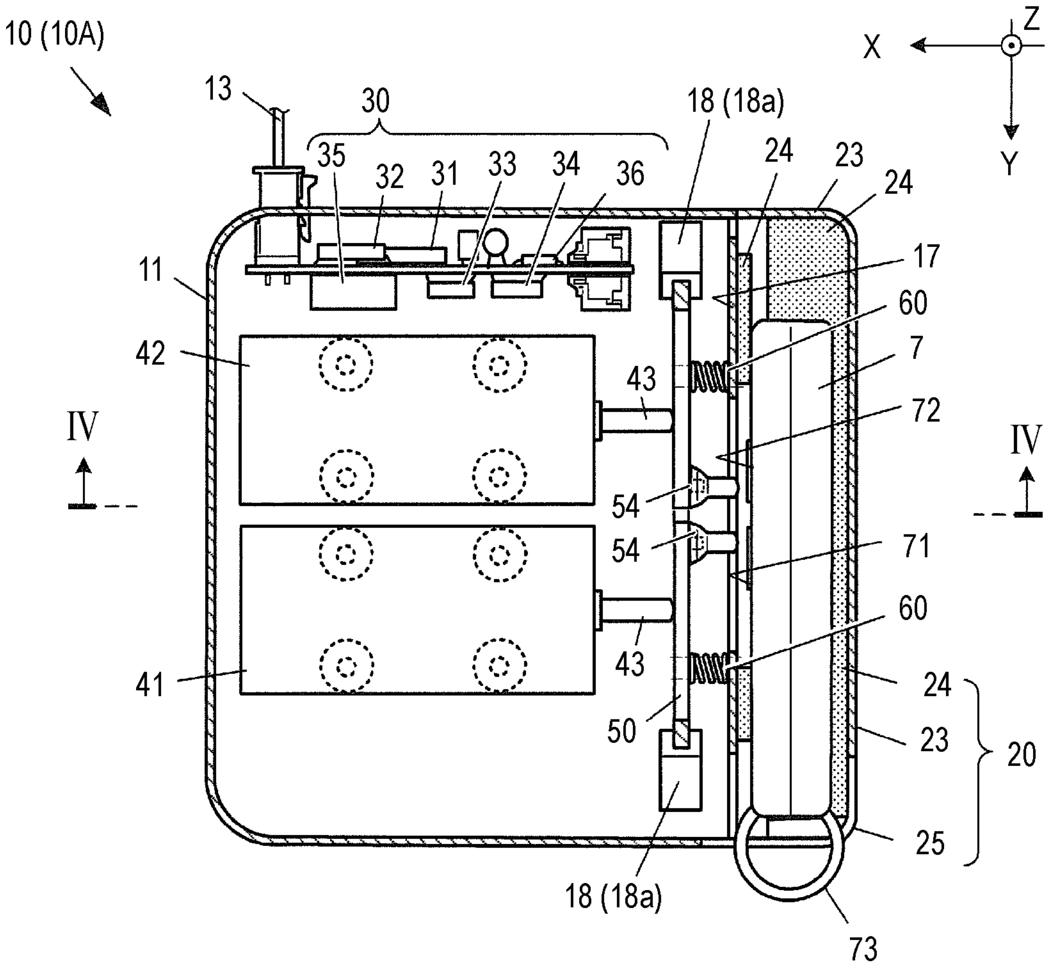
FIG. 3 is an internal structure view showing an example of an internal structure of the vehicle-mounted apparatus as viewed from a positive side of a Z axis.

FIG. 3 is an internal structure view showing an example of an internal structure of the vehicle-mounted apparatus 10 as viewed from the positive side of the Z axis.

Figure 4:
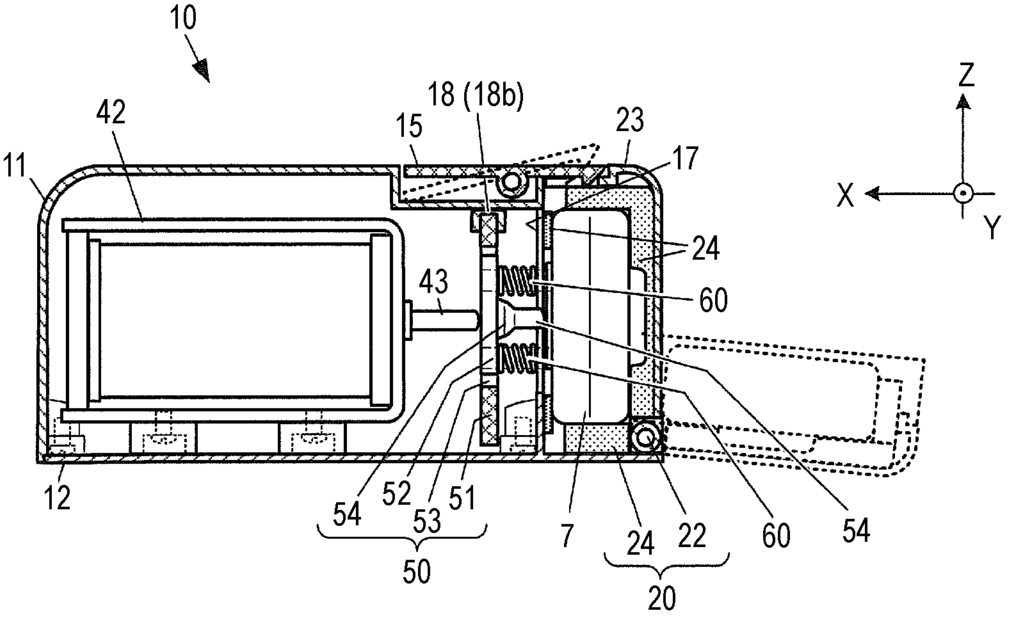
FIG. 4 is an internal structure view showing an example of the internal structure of the vehicle-mounted apparatus as viewed from a positive side of a NT axis direction.

FIG. 4 is an internal structure view showing an example of the internal structure of the vehicle-mounted apparatus 10 as viewed from the positive side of the V axis direction.

The vehicle-mounted apparatus 10 is a key control device that controls an unlocking operation/locking operation, which causes the unlocking button 71/locking button 72 of the electronic key 7 accommodated therein to be pressed in response to an unlocking request/locking request from the user terminal 1500. The vehicle-mounted apparatus 10 is attached to the inside of the vehicle 5 for sharing, for example, in a dashboard.

The vehicle-mounted apparatus 10 includes a main case portion 11, a cable 13 connected to a battery of the vehicle 5, and an accommodation portion 20 that attachably and detachably accommodates the electronic key 7 of the vehicle 5.

The accommodation portion 20 includes a lid portion 23 pivotally supported to the main case portion IT by a swing shaft 22, and an accommodation recess defining member 24 stretching inside the lid portion 23. When an opening and closing operation portion 15 coupling the main case portion 11 and the accommodation portion 20 is pressed and the engagement between the opening and closing operation portion 15 and the accommodation portion 20 is released, the lid portion 23 of the accommodation portion 20 is opened. In FIG. 4, a state where the lid portion 23 is opened is schematically shown by a dotted line.

The lid portion 23 has an opening 25, which is configured to cause a lateral side of the lid portion 23 to be opened at all times even in a state where the lid portion 23 closes the accommodation portion 20, on a side surface in the positive direction of the Y axis. The electronic key 7 is accommodated such that the key ring 73 is exposed to the outside through the opening 25. Since the key ring 73 is exposed, it is possible to confirm that the electronic key 7 is accommodated at a glance from the outside. Since the key ring 73 is exposed, a user can use the key ring 73 as a knob when removing the electronic key 7 from the accommodation portion 20. By using the key ring 73 as a knob in the state where the lid portion 23 is opened in FIG. 4, the electronic key 7 fitted into the accommodation recess defining member 24 can be easily taken out.

The accommodation recess defining member 24 is a member that defines a recess for fitting the electronic key 7. The recess defined by the accommodation recess defining member 24 has a shape conforming to an outer shape of the electronic key 7. The electronic key 7 is fitted and accommodated in the accommodation recess defining member 24 in a posture in which the press buttons are directed in the positive direction of the X axis and the key ring 73 is directed in the positive direction of the Y axis. The accommodation recess defining member 24 is formed of a buffer material such as a hard sponge, and is attached to an inner side of the lid portion 23 by recess-projection fitting, a double-sided tape, or the like.

A partition wall 17 is provided between the accommodation portion 20 and the main case portion 11. The partition wall 17 has a largely opened central portion (portion facing the accommodated electronic key 7), so that an internal space of the accommodation portion 20 is connected to an internal space of the main case portion 11.

The main case portion 11 defines an internal space by screwing a back lid 12. The main case portion 11 accommodates a control substrate 30, a first actuator 41, a second actuator 42, an intermediate member 50, and elastic portions 60. In a configuration in which the vehicle-mounted apparatus 10 includes a built-in battery, the built-in battery may be accommodated in the main case portion 11.

The control substrate 30 includes electronic components and various circuits such as a central processing unit (CPU) 31, an IC memory 32, a first wireless communication module 33, a second wireless communication module 34, a power control circuit 35, and an interface IC 36.

The first wireless communication module 33 is connected to the network 9 (specifically, a wireless communication network such as a mobile phone network or a wireless LAN), and is communicably connected to the server system 1100 that manages a reservation of the vehicle 5 for sharing.

The second wireless communication module 34 implements short-range wireless communication, and communicably connects to the user terminal 1500 that enters a communication range centered on the vehicle 5.

The power control circuit 35 controls power supply to the first actuator 41 and the second actuator 42.

The interface IC 36 implements input and output of signals from the first wireless communication module 33 and the second wireless communication module 34 to the CPU 31.

The control substrate 30 integrally controls operation of the vehicle-mounted apparatus 10 by executing a program stored in the IC memory 32 by the CPU 31.

The first actuator 41 and the second actuator 42 are driven units that operate by drive current provided by the control substrate 30 and perform a press operation on the electronic key 7 accommodated in the accommodation portion 20. Specifically, the first actuator 41 and the second actuator 42 are implemented by a push-type linear solenoid. The first actuator 41 and the second actuator 42 each push out a movable portion 43 (press rod of a non-magnetic material coupled to a movable iron core) by an electromagnetic force in accordance with the supply of a drive current. The first actuator 41 and the second actuator 42 are not provided with a return spring that returns the movable portion 43 to a position before being pushed out in accordance with the stop of the drive current.

No accessory is installed to a tip end of the movable portion 43. The first actuator 41 is fixed to the main case portion 11 in a posture in which the tip end of the movable portion 43 faces the unlocking button 71 of the electronic key 7 accommodated in the accommodation portion 20. The second actuator 42 is fixed to the main case portion 11 in a posture in which the tip end of the movable portion 43 faces the locking button 72 of the electronic key 7 accommodated in the accommodation portion 20.

The intermediate member 50 is a plate-shaped member that is disposed between the electronic key 7 accommodated in the accommodation portion 20, and the first actuator 41 and the second actuator 42, and transmits the push of the movable portions 43 by the first actuator 41 and the second actuator 42 to the press buttons (unlocking button 71, locking button 72) of the electronic key 7 as a force of the press operation. As shown in FIGS. 3 and 4, the intermediate member 50 includes an edge portion 51, a cantilever spring portion 52, a gap portion 53, and buffer members 54. As shown in FIGS. 3 and 4, two elastic portions 60 are provided in front of each of the first actuator 41 and the second actuator 42 along the Z-axis direction between the cantilever spring portion 52 and the partition wall 17.

A plurality of types of installable intermediate members 50 are prepared in the vehicle-mounted apparatus 10.

Figure 5:
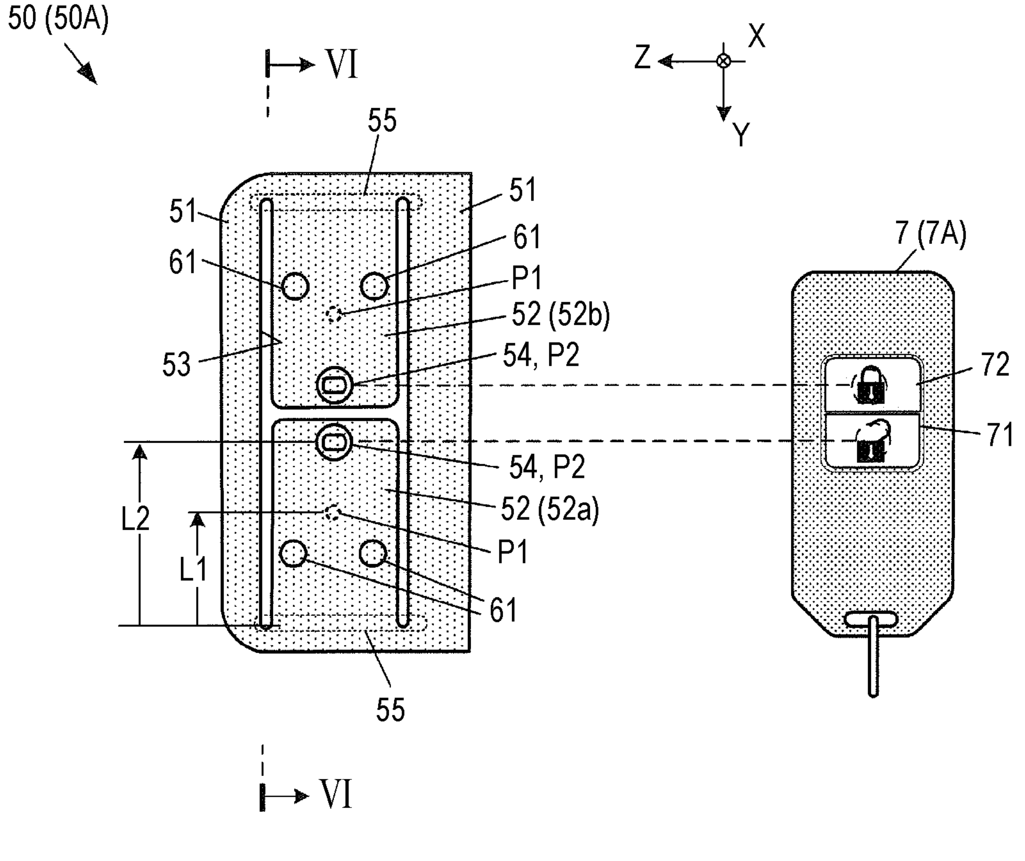
FIG. 5 is a view showing an example of a first intermediate member as viewed from a negative side of an X axis (accommodation portion side).

FIG. 5 is a view showing an example of the first intermediate member 50 (50A) as viewed from the negative side of the X axis (accommodation portion 20 side).

Figure 6:
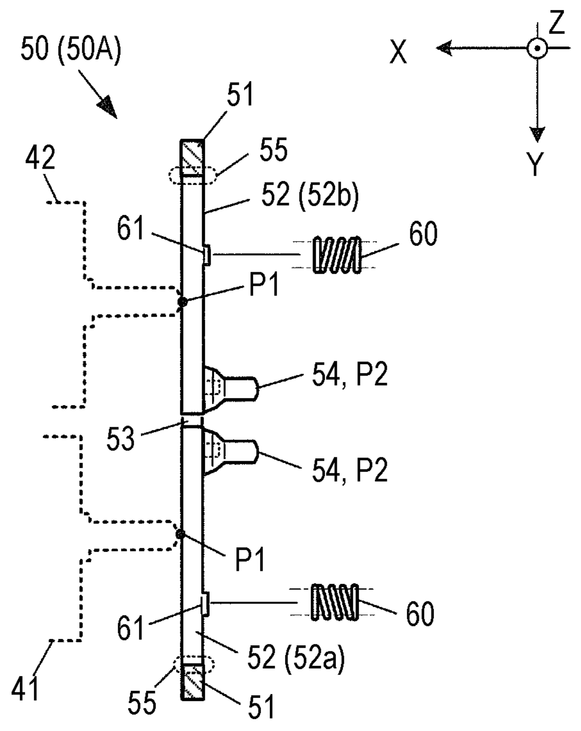
FIG. 6 is a cross-sectional view showing the example of the first intermediate member taken along a plane parallel to an XV plane.

FIG. 6 is a cross-sectional view showing the example of the first intermediate member 50 (50A) taken along a plane parallel to an XY plane.

Figure 7:
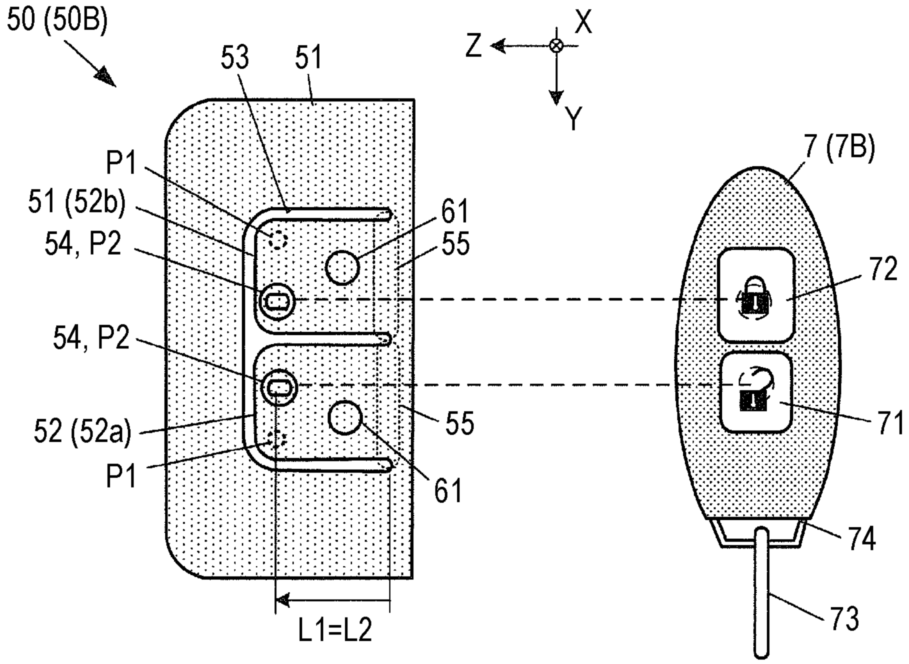
FIG. 7 is a view showing an example of a second intermediate member as viewed from the negative side of the X axis (accommodation portion side).

FIG. 7 is a view showing an example of the second intermediate member 50 (50B) as viewed from the negative side of the X axis.

Figure 8:
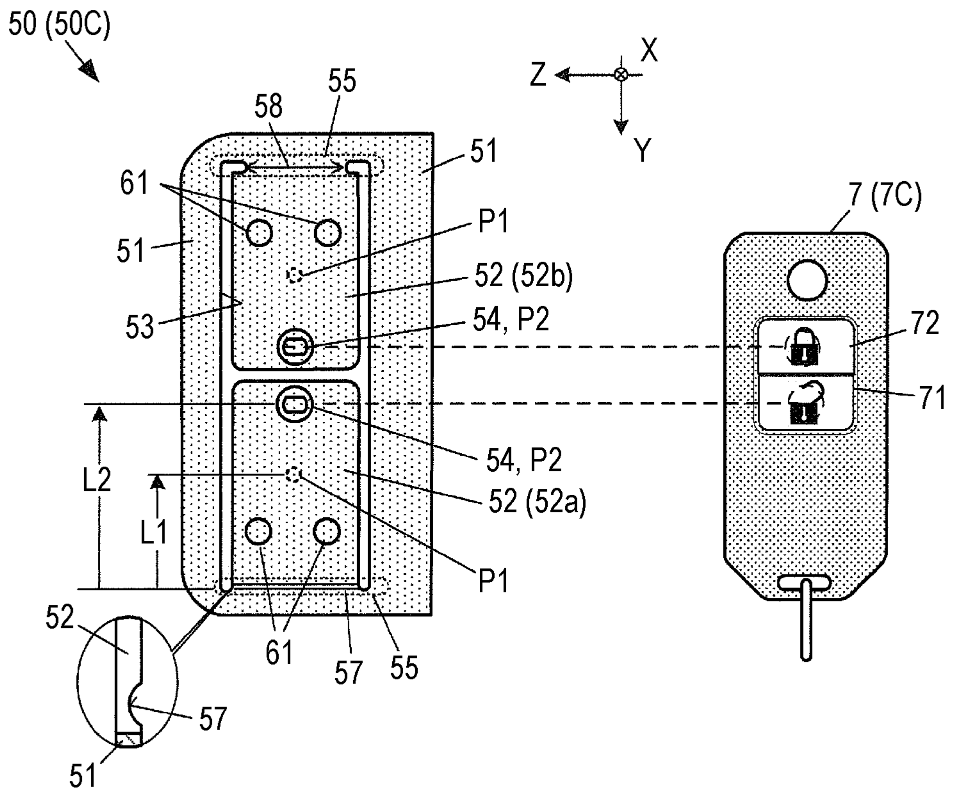
FIG. 8 is a view showing an example of a third intermediate member as viewed from the negative side of the X axis (accommodation portion side).

FIG. 8 is a view showing an example of the third intermediate member 50 (50C) as viewed from the negative side of the X axis.

Figure 9:
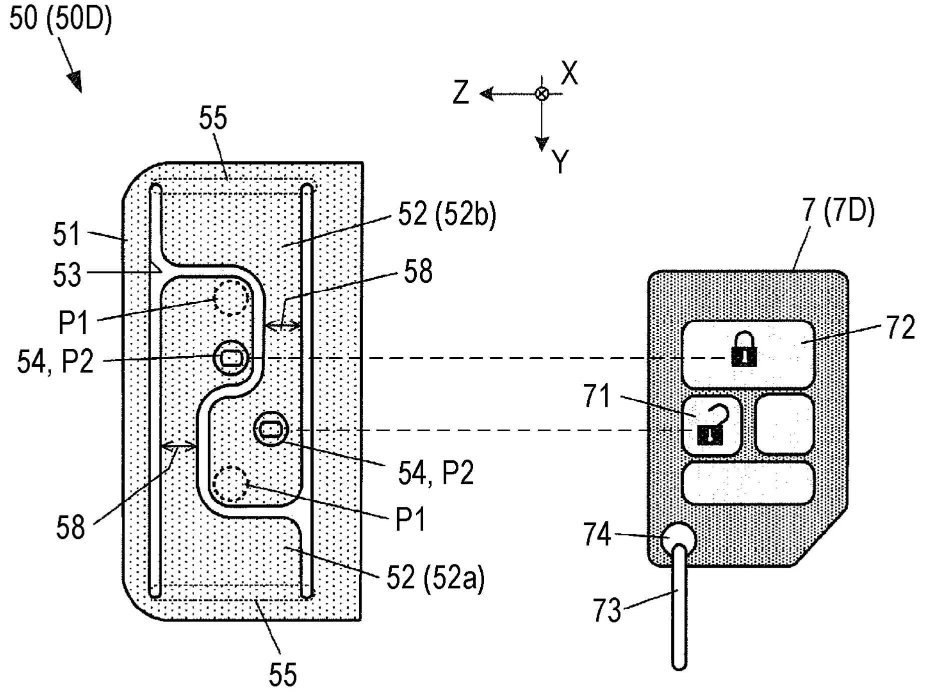
FIG. 9 is a view showing an example of a fourth intermediate member as viewed from the negative side of the X axis (accommodation portion side).

FIG. 9 is a view showing an example of the fourth intermediate member 50 (50D) as viewed from the negative side of the X axis.

The intermediate member 50 is a plate-shaped member having elasticity such as a metal plate or a synthetic resin plate. The intermediate member 50 includes the edge portion 51, the cantilever spring portion 52, and the gap portion 53. By providing the gap portion 53 in the plate-shaped member by cutting, die cutting, or the like, the edge portion 51 and the cantilever spring portion 52 are formed in one plate.

The edge portion 51 is a portion that is fitted into and fixed to a groove of an attachment portion 18 (18*a*, 18*b*) of the main case portion 11. The first attachment portion 18*a* has a groove along the Z-axis direction on two inner surfaces on a positive side of the Y axis and on a negative side of the Y axis, which are inner surfaces of the main case portion 11 (see FIG. 3). The second attachment portion 18*b* has a groove along the Y-axis direction on an inner surface on a positive side of the Z axis of the main case portion 11 (see FIG. 4).

The edge portion 51 is fitted into the attachment portion 18 with such a strength that the intermediate member 50 can be pulled out by a human hand, although the edge portion 51 does not come off or deviate from the attachment portion 18 due to vibration or the like of the vehicle 5. An external shape of the intermediate member 50 and a plate thickness of the edge portion 51 are common to all types of intermediate members 50, and any type of intermediate member 50 is attachable to the attachment portion 18 (18*a*, 18*b*).

The intermediate member 50 is detachably attached to the main case portion 11 by the edge portion 51. The work of assembling the intermediate member 50 to the main case portion 11 and pulling out the intermediate member 50 from the main case portion 11 is simple.

The cantilever spring portion 52 functions as a "cantilever plate spring" by being pressed by the movable portions 43 in accordance with the operation of the first actuator 41 and the second actuator 42. Specifically, as the cantilever spring portion 52, two of a first cantilever spring portion 52*a* pressed by the first actuator 41 and a second cantilever spring portion 52*b* pressed by the second actuator 42 are provided.

One of two surfaces of the cantilever spring portion 52 (52*a*, 52*b*) (first actuator 41 and second actuator 42 side; positive side of X axis) has force point portions P1 with which the movable portions 43 of the actuators come into contact. The other one of the two surfaces (accommodation portion 20 side; negative side of the X axis) has install portions 61 and acting point portions P2 for applying a force to the press buttons (unlocking button 71, locking button 72) of the electronic key 7 accommodated in the accommodation portion 20.

The buffer members 54 protrude on the acting point portion P2 toward the press buttons.

When the first actuator 41 and the second actuator 42 operate, an impact force generated by collision of the movable portions 43 with the intermediate member 50 is transmitted to the press buttons (unlocking button 71, locking button 72) of the electronic key 7 by the intermediate member 50. However, the transmitted force is reduced by the buffer members 54. The buffer members 54 can be implemented by, for example, silicon, butyl rubber, or a spring. The example in the drawings shows a member obtained by molding silicon into a nipple shape.

The elastic portions 60 are attached to the install portions 61.

The elastic portions 60 are provided between the cantilever spring portion 52 and a side surface of the partition wall 17 in the positive side of the X axis.

The elastic portions 60 are, for example, coil springs, and the install portions 61 are protrusions fitted into the coil springs. The vehicle-mounted apparatus 10 shown in FIGS. 3 and 4 employs the intermediate member 50 shown in FIGS. 5 and 6.

The material of the intermediate member 50, the width and the plate thickness of fulcrum portions 55 of the cantilever spring portion 52, the specification of the elastic portions 60, and the number and positions of the elastic portions 60 to be installed are selected and set to satisfy the following (1) to (3).

(1) When the first actuator 41 and the second actuator 42 operate, the intermediate member 50, the cantilever spring portion 52 and the elastic portions 60 are deflected by a load received from the movable portions 43.

(2) With the deflection in (1), tip ends of the buffer members 54 come into contact with the press buttons (unlocking button 71, locking button 72) of the electronic key 7 accommodated in the accommodation portion 20, and a stroke sufficient to operate the press buttons is obtained by the deflection.

(3) A resultant force of an elastic force due to the deflection of the cantilever spring portion 52 and a restoring force of the elastic portions 60 exerted by being compressed and elastically deformed between the cantilever spring portion 52 and the partition wall 17 due to the deflection of the cantilever spring portion 52 is a biasing force sufficient to return the movable portions 43 of the first actuator 41 and the second actuator 42 to the position before the operation.

In a state where the first actuator 41 and the second actuator 42 do not operate, the cantilever spring portion 52 is in a state of being not deflected or substantially not deflected, but the elastic portions 60 are in a preset state of being slightly compressed. The preset load of the elastic portions 60 biases the cantilever spring portion 52 toward the actuators and keeps the movable portions 43 at an initial position. In the state where the first actuator 41 and the second actuator 42 do not operate, the buffer members 54 do not exert an enough elastic force to press the press buttons of the electronic key 7.

Even when the first actuator 41 and the second actuator 42 operate and an impact force is applied to the intermediate member 50, the force transmitted to the press buttons (unlocking button 71, locking button 72) is appropriately reduced by the deflection of the cantilever spring portion 52, the compression of the elastic portions 60, and the buffer members 54, and the press buttons are protected from the impact force.

By adopting the intermediate member 50 and the buffer members 54 and appropriately setting these specifications, the vehicle-mounted apparatus 10 can deal with various types of electronic keys 7.

Specifically, even when the first actuator 41 and the second actuator 42 press the intermediate member 50 with the same load, the force transmitted to the press buttons (unlocking button 71, locking button 72) of the electronic key 7 finally changes depending on a distance L1 and a distance L2. The distance L1 is a distance from the fulcrum portion 55 of the cantilever spring portion 52 to the force point portion P1. The distance L2 is a distance from the fulcrum portion 55 to the acting point portion P2.

Therefore, the vehicle-mounted apparatus 10 according to the present embodiment can have various design degrees of freedom corresponding to the operation load, the withstand load, and the operation stroke of the press buttons (unlocking button 71, locking button 72) of the electronic key 7. For example, when it is desired to make the load transmitted to the press buttons smaller than the load by which the first actuator 41 and the second actuator 42 press the intermediate member 50, it is possible to cope with this situation by making "the distance L1 from the fulcrum portion 55 to the force point portion P1"<"the distance L2 from the fulcrum portion 55 to the acting point portion P2" as in the first intermediate member 50 (50A) shown in FIGS. 5 and 6.

For example, when it is desired to make the load by which the first actuator 41 and the second actuator 42 press the intermediate member 50 substantially the same as the load transmitted to the press buttons, as shown in FIG. 7, it is possible to cope with this situation by making "the distance L1 from the fulcrum portion 55 to the force point portion P1" and the "distance L2 from the fulcrum portion 55 to the acting point portion P2" the same or substantially the same.

For example, the electronic key 7 (7C) shown in FIG. 8 has the same relative positional relationship between the press buttons (unlocking button 71, locking button 72) as that of an electronic key 7A shown in FIG. 5, but the operation load of the press buttons is larger or the operation stroke is larger than that of the electronic key 7A shown in FIG. 5. The third intermediate member 50 (50C) corresponding to the electronic key 7 (7C) basically has the same design as the first intermediate member 50 (50A) in FIG. 5, but has a local small-thickness portion 57 at the fulcrum portion 55. Alternatively, the fulcrum portion 55 has a local small-width portion 58. Accordingly, in the third intermediate member 50 (50C), the cantilever spring portion 52 is more likely to be deflected than the first intermediate member 50 (50A) in FIG. 5, and the load transmitted to the press buttons can be larger, or the operation stroke can be larger.

As another specification, as in the fourth intermediate member 50 (50D) shown in FIG. 9, the entire length of the cantilever spring portion 52 may be set to be larger, and the small-width portion 58 may be further provided. In the specification of FIG. 9, the elastic portions 60 (install portions 61) are omitted. The elastic portions 60 (install portions 61) may also be provided.

Types of the intermediate member 50 prepared for the vehicle-mounted apparatus 10 are not limited to examples of such four types, and there may be more types of the intermediate member 50. For example, the intermediate member 50 having the acting portion P2 at a different position may also be prepared, while the positions are the same in terms of the edge portion 51, the cantilever spring portion 52, and the force point portion P1. By appropriately setting the acting point portion P2, the intermediate member 50 corresponds to the arrangement difference of the press buttons (unlocking button 71, locking button 72) of the electronic key 7.

In the vehicle-mounted apparatus 10, a set of the intermediate member 50 and the accommodation recess defining member 24 corresponding to the type of the electronic key 7 is prepared. As described above, since the intermediate member 50 can be easily inserted into and removed from the attachment portion 18, the user can easily and reliably replace the intermediate member 50. The accommodation recess defining member 24 can also be easily replaced.

The vehicle-mounted apparatus 10 includes an element that reduces an impact force of the movable portions 43 in a process of transmitting the impact force. The element is provided independently of the first actuator 41 and the second actuator 42. For this reason, in addition to excellent assemblability and a high degree of freedom in design as described above, a secondary effect of the downsizing vehicle-mounted apparatus 10 can also be achieved.

Figure 10:
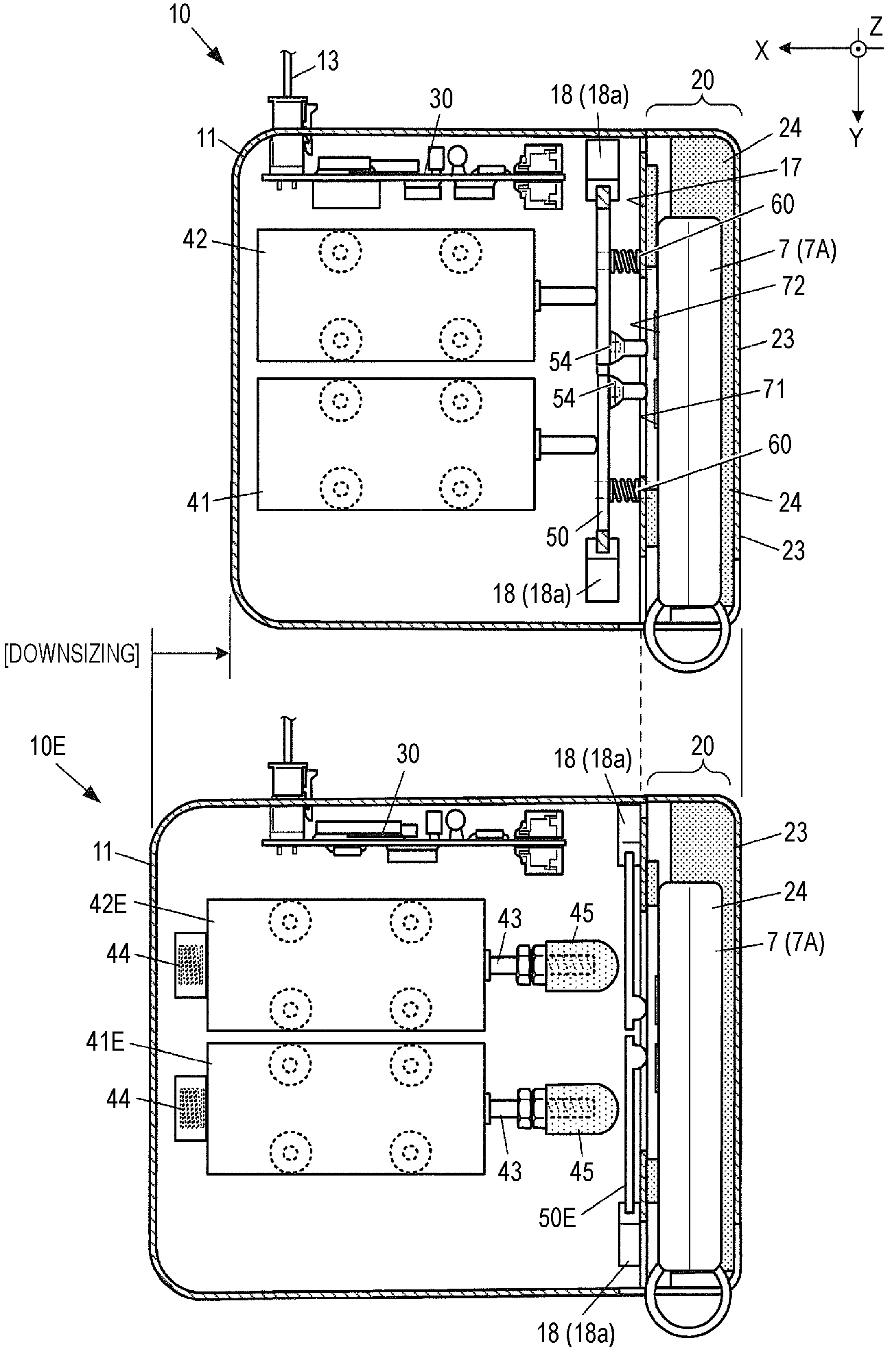
FIG. 10 is a view illustrating an effect of the downsizing vehicle-mounted apparatus.

FIG. 10 is a view illustrating an effect of the downsizing vehicle-mounted apparatus 10.

A vehicle-mounted apparatus 10E shown on a lower side of FIG. 10 corresponds to a device in the related art. Each of a first actuator 41E and a second actuator 42E of the vehicle-mounted apparatus 10E includes a screw buffer material 45 at a tip end portion of the movable portion 43. Each of the first actuator 41E and the second actuator 42E includes a return spring 44 for returning the movable portion 43. When a linear solenoid of such a type is adopted, a structural element (for example, a screw portion, a double nut for locking loosening of the buffer material 45) necessary for screwing the buffer material 45 increases the entire length of the actuator. As a result, the length of the vehicle-mounted apparatus 10E in the X-axis direction (operation direction of the actuator) is increased due to this influence.

However, in the vehicle-mounted apparatus 10 of the present embodiment, the cantilever spring portion 52 and the buffer members 54 of the intermediate member 50 replace the return springs 44. The first actuator 41 and the second actuator 42 do not include the buffer material 45 and a structural element necessary for screwing the buffer material 45. In the vehicle-mounted apparatus 10 that employs a linear solenoid smaller than the first actuator 41E and the second actuator 42E, the length of the vehicle-mounted apparatus 10 in the X-axis direction can be made shorter than that of the vehicle-mounted apparatus 10E in the related art.

As described above, the cantilever spring portion 52 functions as a first return portion that returns the movable portions 43 of the first actuator 41 and the second actuator 42 to the position before the operation. Specifically, the cantilever spring portion 52 is pressed and deflected by the movable portions 43 to exert a biasing force for biasing in a direction opposite to a movable direction (operation direction of the actuators) of the movable portions 43.

The elastic portions 60 also function as a second return portion, Specifically, when the cantilever spring portion 52 is pressed and deflected by the movable portions 43, the elastic portions 60 are compressed between the cantilever spring portion 52 and the partition wall 17 and exert a restoring force, and biases in the direction opposite to the moving direction of the movable portions 43 via the cantilever sprint portion 52.

Since the first actuator 41 and the second actuator 42 do not include a return spring, the length of the vehicle-mounted apparatus 10 in the X-axis direction can be reduced as compared with a case where a linear solenoid including a return spring is employed.

Other Embodiments

Although one embodiment is described above, the aspect of the present disclosure is not limited to the above embodiment, and components can be appropriately added, omitted, or changed.

(1)

For example, the elastic portions 60 may be omitted from the above-described embodiment. In this case, the biasing force for returning the movable portions 43 of the first actuator 41 and the second actuator 42 depends on the elastic force of the cantilever spring portion 52 and the elastic force of the buffer members 54. For this reason, it is necessary to take measures such as making the intermediate member 50 have a sufficient plate thickness.

(2)

Figure 11:
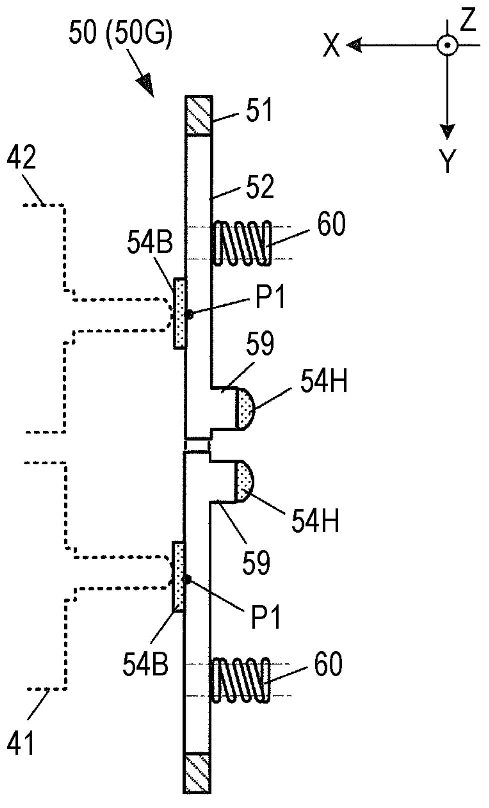
FIG. 11 is a view showing a first modification of an intermediate member as viewed from the negative side of the X axis (accommodation portion side).

As in the intermediate member 50 (50B) shown in FIG. 11, second buffer members 54B may be added to the force point portions P1 of the side surface on the positive side of the X axis of the cantilever spring portion 52. Instead of providing the second buffer members 54B, the buffer members 54 may be omitted, and protruding portions instead of the buffer members 54 may be provided on the cantilever spring portion 52. In addition, buffer members 54H may be attached to tip ends of pedestal portions 59 that protrude in the negative direction of the X axis (accommodation portion 20 side) from the acting point portions P2.

(3)

Figure 12:
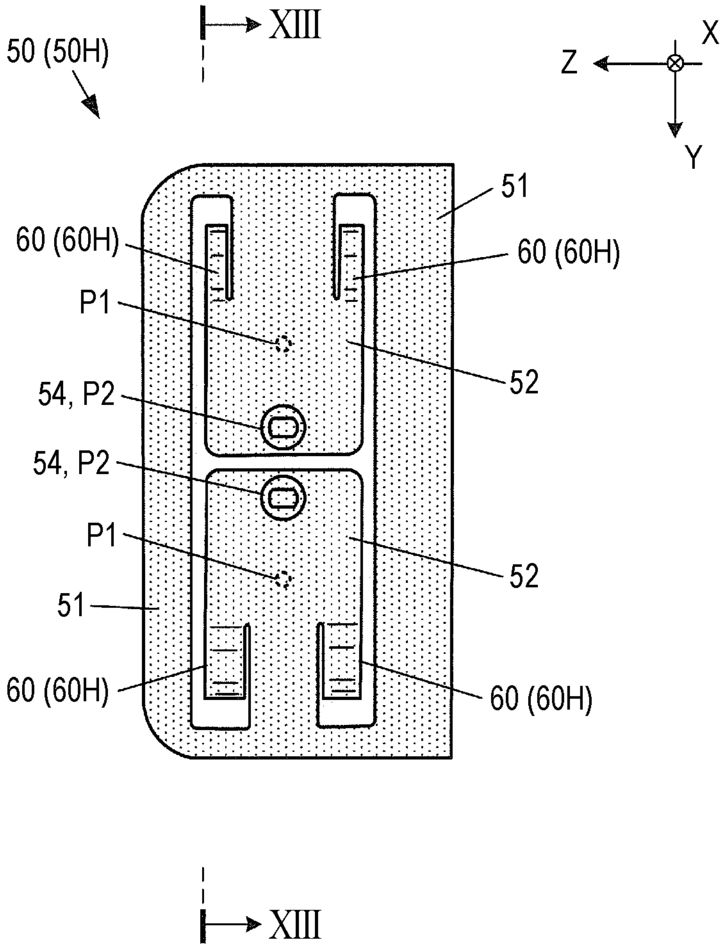
FIG. 12 is a view showing a second modification of the intermediate member as viewed from the negative side of the X axis (accommodation portion side).
Figure 13:
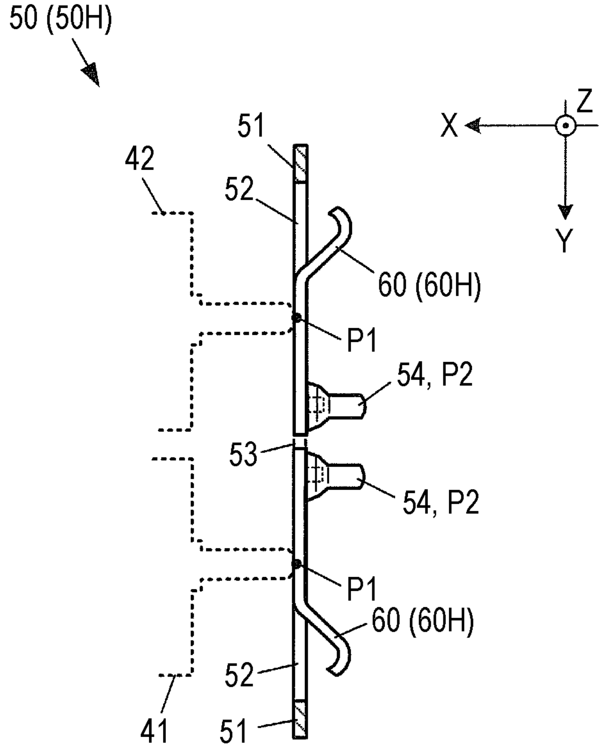
FIG. 13 is a cross-sectional view showing the second modification of the intermediate member taken along the plane parallel to the XV plane.

The elastic portions 60 are not limited to the coil springs as in the above embodiment. For example, as in the intermediate member 50 (50H) shown in FIGS. 12 and 13, edge portions of the cantilever spring portion 52 may be deflected in the negative direction of the X axis and form the plate spring type elastic portions 60 (60H). When the intermediate member 50 (50H) is assembled to the main case portion 11, the elastic portions 60 (60H) abut against the partition wall 17 and are slightly elastically deformed. The restoring force due to the deformation is applied as a holding force for holding the movable portions 43 of the first actuator 41 and the second actuator 42 at the initial position. When the first actuator 41 and the second actuator 42 operate, the elastic portions 60 (60H) are further deflected and exert a restoring force. When the electromagnetic force of the first actuator 41 and the second actuator 42 disappears, the movable portions 43 are returned to the initial position by the restoring force.

(4)

Figure 14:
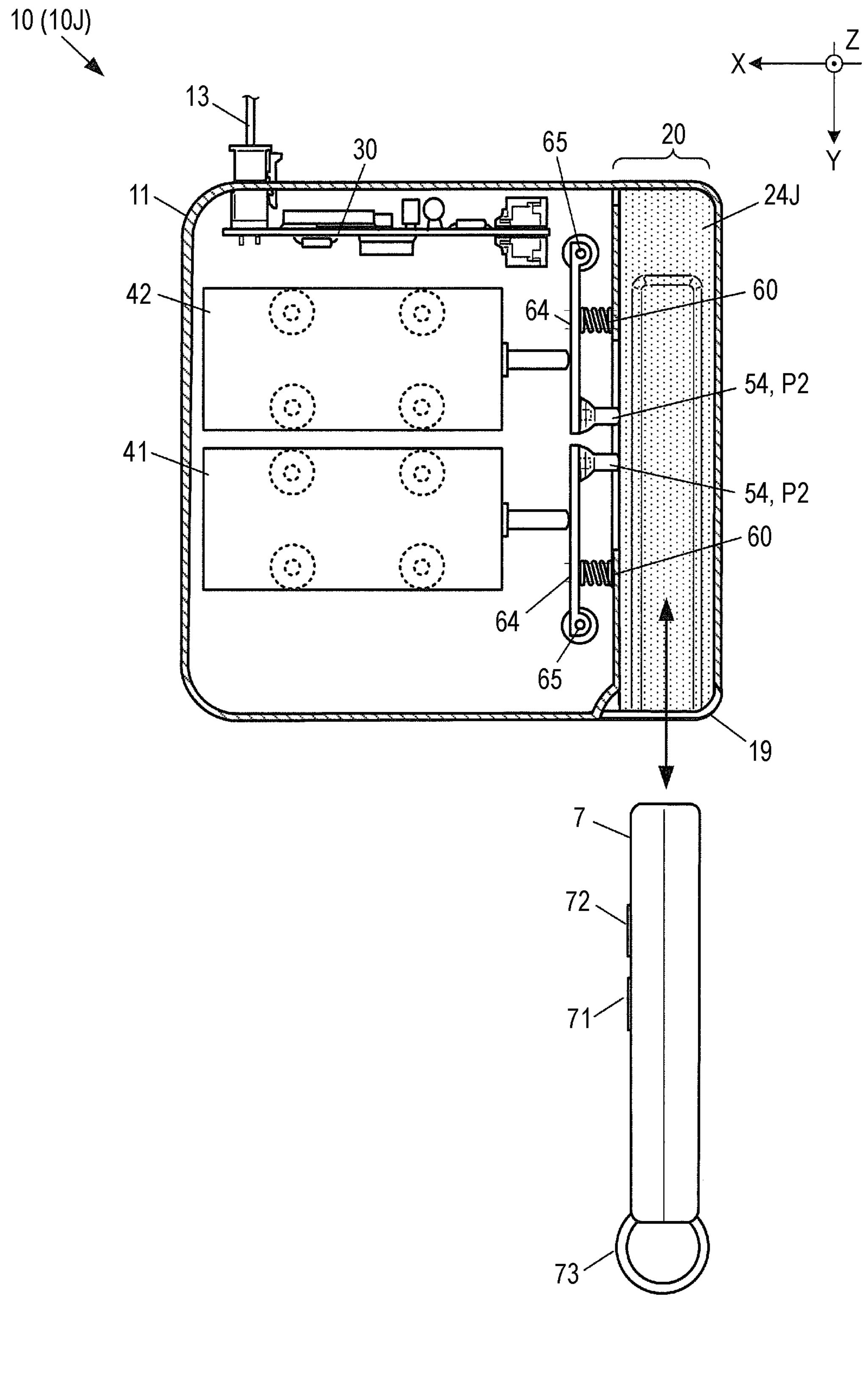
FIG. 14 is an internal structure view showing a third modification of the intermediate member as the vehicle-mounted apparatus is viewed from the positive side of the Z axis.

The intermediate member 50 of the above embodiment may be replaced with a flat plate-shaped swing portion 64 along the YZ plane as in the vehicle-mounted apparatus 10 (10J) of FIG. 14. The swing portion 64 is provided for each of the first actuator 41 and the second actuator 42, and is pivotally supported by a shaft 65 in the Z-axis direction inside the main case portion 11 in a manner of being swingable in the X-axis direction. Similarly to those for the intermediate member 50, the buffer member 54 and the elastic portions 60 are provided on a surface on the negative side of the X axis (surface on the accommodation portion 20 side) of the swing portion 64.

In the above-described embodiment, the lid portion 23 of the accommodation portion 20 is opened and closed to accommodate and remove the electronic key 7. Alternatively, the lid portion 23 may be omitted. Specifically, in the vehicle-mounted apparatus 10J, the lid portion 23 is omitted, and instead, the vehicle-mounted apparatus 10J has an insertion opening 19 into which the electronic key 7 can be inserted at an end portion of an accommodation portion 20J in the positive direction of the Y axis. An accommodation recess defining member 24J of the vehicle-mounted apparatus 10J has a tubular structure having an insertion opening into which the electronic key 7 can be inserted from the positive direction of the Y axis. The electronic key 7 is inserted into and removed from the accommodation recess defining member 24J through the insertion opening 19 and the insertion opening of the accommodation recess defining member 24J.

SUMMARY

The disclosure of the present specification according to the embodiment described above can be summarized as follows.

According to an aspect of the present disclosure, there is provided a vehicle-mounted apparatus including: an accommodation portion that is configured to accommodate an electronic key of a vehicle; an actuator that is configured to perform a press operation to the electronic key accommodated in the accommodation portion by moving a movable portion in one direction; and an intermediate member that is disposed between the electronic key accommodated in the accommodation portion and the actuator and that is configured to transmit a force of the press operation to a press button of the electronic key. The intermediate member is configured to abut against the movable portion and to apply a biasing force for biasing the movable portion in a direction opposite to the one direction.

According to this aspect, the actuator does not need to be provided with a return spring. For this reason, in the vehicle-mounted apparatus in which the press button of the accommodated electronic key is mechanically pressed and operated by the actuator, the length in the operating direction can be made shorter than that of a device in the related art.

The intermediate member may include a cantilever spring portion, and the biasing force may include at least a force based on an elastic force of the cantilever spring portion.

The vehicle-mounted apparatus may further include an elastic portion that is configured to abut against the intermediate member and that is elastically deformable in the one direction, and the biasing force may include at least a force based on a restoring force of the elastically deformed elastic portion.

The intermediate member may include a plate spring portion, and the biasing force may include at least a force based on an elastic force of the plate spring portion.

The vehicle-mounted apparatus may further include an elastic portion that is configured to abut against the intermediate member and that is elastically deformable in the one direction, the intermediate member may be a swing portion pivotally supported by a predetermined shaft, and the biasing force may include at least a force based on a restoring force of the elastically deformed elastic portion.

REFERENCE SIGNS LIST

- 3 sharing system
- 5 vehicle
- 7, 7A, 7B electronic key
- 9 network
- 10, 10E, 10J vehicle-mounted apparatus
- 11 main case portion
- 12 back lid
- 13 cable
- 15 opening and closing operation portion
- 17 partition wall
- 18 attachment portion
- 18*a* first attachment portion
- 18*b* second attachment portion
- 19 insertion opening
- 20, 20J accommodation portion
- 22 swing shaft
- 23 lid portion
- 24 accommodation recess defining member
- 25 opening
- 30 control substrate
- 31 CPU
- 32 IC memory
- 33 first wireless communication module
- 34 second wireless communication module
- 35 power control circuit
- 36 interface IC
- 41 first actuator
- 42 second actuator
- 43 movable portion
- 44 return spring
- 45 buffer material
- 50 intermediate member
- 51 edge portion
- 52 cantilever spring portion
- 52*a* first cantilever spring portion
- 52*b* second cantilever spring portion
- 53 gap portion
- 54 buffer member
- 55 fulcrum portion
- 57 small-thickness portion
- 58 small-width portion
- 60 elastic portion
- 61 install portion
- 64 swing portion
- 65 shaft
- 71 unlocking button
- 72 locking button
- 73 key ring
- 74 key ring install portion
- 501 management program

502 terminal program
700 reservation information
700*c* reservation information
700*t* reservation information
1100 server system
1500 user terminal
L1 distance
L2 distance
P1 force point portion
P2 acting point portion

The invention claimed is:

1. A vehicle-mounted apparatus comprising:

an accommodation portion that is configured to accommodate an electronic key of a vehicle;

an actuator that is configured to perform a press operation to the electronic key accommodated in the accommodation portion by moving a movable portion in one direction;

an intermediate member that is disposed between the electronic key accommodated in the accommodation portion and the actuator and that is configured to transmit a force of the press operation to a press button of the electronic key; and an elastic portion that is disposed between the electronic key accommodated in the accommodation portion and the intermediate member, wherein the intermediate member is configured to transmit the force of the press operation to the press button of the electronic key by a rotation movement around a fulcrum portion provided at the intermediate member, and wherein the elastic portion is configured to exert a restoring force when the elastic portion receives the force of the press operation transmitted by the rotation movement and is configured to press back the intermediate member in a direction opposite to a direction of the rotation movement with the restoring force, so that the intermediate member is configured to abut against the movable portion and to apply a biasing force for biasing the movable portion in a direction opposite to the one direction.

2. The vehicle-mounted apparatus according to claim 1, wherein the intermediate member includes a cantilever spring portion, and wherein the biasing force includes at least a force based on an elastic force of the cantilever spring portion.

3. The vehicle-mounted apparatus according to claim 1, wherein the elastic portion is configured to abut against the intermediate member and is elastically deformable in the one direction, and wherein the biasing force includes at least a force based on the restoring force of the elastically deformed elastic portion.

4. The vehicle-mounted apparatus according to claim 1, wherein the intermediate member includes a plate spring portion, and wherein the biasing force includes at least a force based on an elastic force of the plate spring portion.

5. The vehicle-mounted apparatus according to claim 1, wherein the intermediate member is a swing portion pivotally supported by a predetermined shaft, and wherein the biasing force includes at least a force based on the restoring force of the elastically deformed elastic portion.

6. The vehicle-mounted apparatus according to claim 1, further comprising:

a partition wall provided between the electronic key accommodated in the accommodation portion and the intermediate member and including an opening at a portion facing the electronic key, wherein the elastic portion is provided between the partition wall and the intermediate member.

* * * * *